March 21, 1961 O. E. MATTIAT 2,976,501

IMPEDANCE TRANSFORMER

Filed July 30, 1959

INVENTOR,
OSKAR E. MATTIAT

BY Harry M. Saragovitz

ATTORNEY.

United States Patent Office 2,976,501
Patented Mar. 21, 1961

2,976,501
IMPEDANCE TRANSFORMER

Oskar E. Mattiat, Santa Barbara, Calif., assignor to the United States of America as represented by the Secretary of the Army Filed July 30, 1959, Ser. No. 830,686
6 Claims. (Cl. 333—32)

This invention relates to piezoelectric filter transformers and more particularly to piezoelectric disk filter-impedance transformers operating at radio frequencies.

With the wide-spread use of transistors a great need appears for a miniaturized high Q transformer operating at radio-frequencies and exhibiting good impedance transformation characteristics.

For instance, it is well known that the output impedance of a transistor is dependent on its input impedance. Therefore, for best operation, the output impedance of one transistor stage should be suitably matched to the input impedance of the next succeeding stage. This impedance matching is usually accomplished by an impedance transformer. In addition to being an impedance matcher, the transformer must also often be a frequency selector. An example of one kind of frequency selective impedance transformer is the widely used intermediate-frequency (I-F) transformer.

It is therefore an object of this invention to provide a frequency selective impedance transformer.

It is another object of the present invention to utilize a piezoelectric ceramic disk as a miniaturized I-F transformer especially suitable for transistorized radio equipment.

It is an additional object of this invention to provide barium titanate resonant filter transformers which permit reductions in size and cost with increased ruggedness and frequency selectivity.

These and other objects are obtained by using suitably prepolarized ring and dot electroded piezoelectric ceramic disks in series or parallel circuit combinations.

The features of this invention which are believed to be novel are set forth with particularity in the appended claims. The present invention itself, both as to its organization and manner of operation, together with further objects and advantages thereof may best be understood by reference to the following description taken in connection with accompanying drawings, in which like reference characters refer to similar parts and in which:

Figure 1:
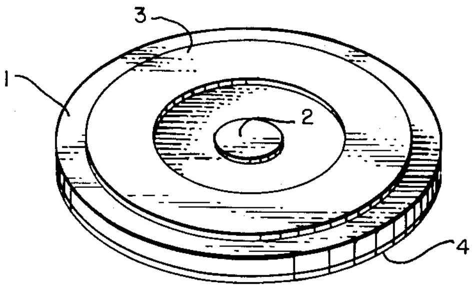
Figure 1 is a perspective view of a known type of dot and ring electroded piezoelectric ceramic filter transformer.
Figure 2:
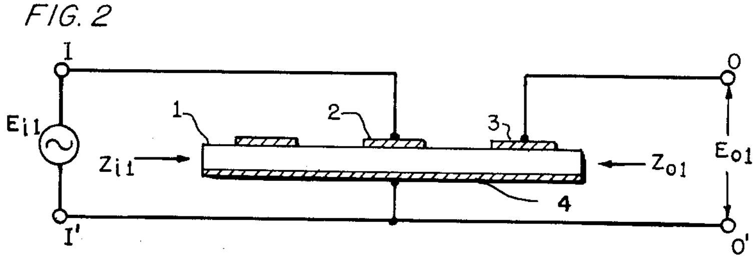
Figure 2 shows a cross-sectional view of the transformer of Fig. 1 taken along a diameter together with input and output circuit connections.

In Figures 1 and 2, the piezoelectric disk 1 is made of barium titanate mixed with other titanates, or of any other piezoelectric ceramic material. The circular dot electrode 2, the ring electrode 3, and the counter electrode 4 are made of a conducting material such as silver, platinum, etc., suitably applied onto the ceramic disk by well known spray or similar techniques. The thickness of the electrodes has been greatly exagerated in the drawings. After the application of the electrodes, the disk is suitably prepolarized in an axial direction, the method of polarization being outside the scope of this invention.

A high frequency voltage source $E_{i1}$ is connected to the dot electrode 2 and to the counter electrode 4. The output voltage $E_{01}$ is taken from the ring electrode 3 and the counter electrode 4. Although in Fig. 2 the piezoelectric filter is shown to be a three terminal network, it should be understood that this representation is given for simplicity only. Specifically, both sides of the disk could be electroded with dot and ring electrodes, if desired. Such a disk would be a four-terminal network as is more fully explained in my copending application Serial No. 774,563, filed on November 17, 1958, and now U.S. Patent No. 2,943,278.

The diameter of disk 1 is so chosen that it resonates at the applied excitation frequency. It is known that the radial resonant frequency of a relatively thin disk is determined essentially by its diameter, which for a fundamental 455-kc. disk would be in the order of 0.2 inch.

In operation, when an alternating voltage signal $E_{i1}$ is applied to the input terminals I, I′ of an axially polarized disk 1, mechanical vibrations are created in a radial direction, i.e., in a plane perpendicular to the axis of polarization. Because of the piezoelectric characteristics of the prepolarized ceramic material, these radial vibrations generate, in turn, axial alternating voltages between the flat surfaces of the disk. The frequencies of the generated A.-C. voltages at any point on the surface are the same as the frequencies of the radial mechanical vibrations at that point. The center of ring electrode 3 is placed at a point of maximum radial stress and the output voltage $E_{01}$ is taken from output terminals O, O′.

The voltage transformation ratio $E_{i1}/E_{01}$ is dependent on the impedance transformation ratio $n_1 = Z_{i1}/Z_{01}$, where $Z_{i1}$ and $Z_{01}$ are the impedances looking into the input and output terminals, respectively. The input and output impedances are primarily determined by the capacitances between electrodes 2, 4, and 3, 4, respectively. To vary either or both of these capacitances and therefore the impedances, two methods are readily available: (1) the electrode area is changed and (2) the thickness of the disk is varied. There are, however, well recognized physical limitations in the employment of these known methods which seriously limit the usefulness of the disk of Figure 1 as an impedance transformer.

Figure 3:
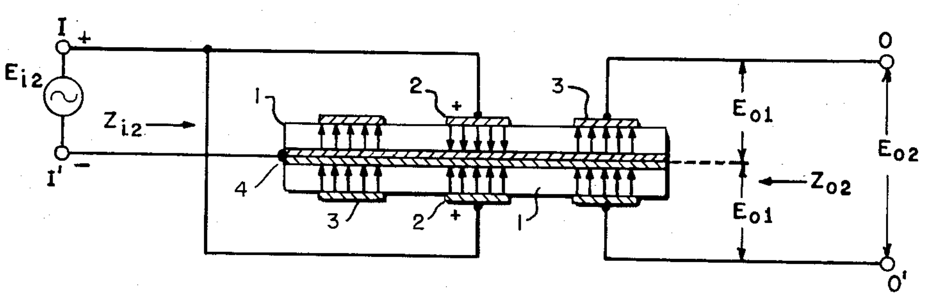
Figure 3 is a cross-sectional representation of a step-down impedance transformer in accordance with one embodiment of this invention.

In Figure 3 is shown one embodiment of this invention. Two electroded disks, akin to the one shown in Figure 1, are mechanically coupled by soldering or cementing together the cover electrodes. The input and output terminals are connected to the disk assembly, as shown. In each disk the axial polarization between the ring electrodes is in the same direction, and between the circular dot electrodes in opposite directions, as shown by the small arrows.

In operation, upon the application of a high frequency voltage source $E_{i2}$ to the "driving section" i.e., the portion of the disk sandwiched between the dot and the cover electrode; the "driven section," i.e., the portion of the disk sandwiched between the ring and the cover electrode, will be in mechanical vibration. At one instant of time terminal I in Figure 3 will be positive with respect to terminal I′. Since the direction of the axial polarization within the driving sections is at this instant, from positive to negative, they will vibrate in phase, i.e., either expand or contract simultaneously in the axial direction. These expansions or contractions of the driving sections produce in turn, radial stresses within the driven sections. These radial stresses, the frequency of which corresponds to the frequency of the excitation voltage, generate in-phase alternating voltages within the driven section of each disk. The generated A.-C. voltages are in phase because the axial polarization of the driven section of each disk is in the same direction. A similar analysis could be made by assuming, for one instant of time, terminal I to be negative with respect to terminal I'.

Since the output voltages of the two disks of Figure 3 are in phase, the total output voltage $E_{o2}$ is the arithmetical summation of the generated voltages between the ring electrodes. Because the driving sections are electrically connected in parallel and the driven section in series, the input impedance $Z_{i2}=\frac{1}{2}Z_{i1}$ and the output impedance $Z_{o2}=2Z_{o1}$, therefore the impedance transformation ratio $n_2$ is:

$$n_2=\frac{Z_{i2}}{Z_{o2}}=\frac{Z_{i1}/2}{2Z_{o1}}=\frac{1}{4}\frac{Z_{i1}}{Z_{o1}}=\frac{1}{4}n_1 \tag{1}$$

where $n_1$ is the impedance transformation ratio of Figure 1. Equation 1 shows that the embodiment of Figure 3 is a four to one step-down impedance transformer.

Figure 4:
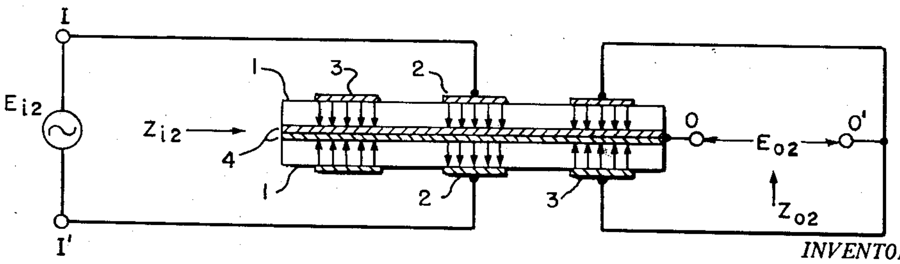
Figure 4 is another embodiment of this invention showing in cross-section a step-up impedance transformer.

In Figure 4 is shown a step-up impedance transformer. The two electroded disks are mechanically assembled as in Figure 3, only the polarization and the electrical wiring being different. The axial polarization between the ring and the cover electrodes within each disk are in opposite directions and between the dot and the cover electrodes in the same direction, as shown by the arrows. The driving sections are electrically connected in series and the driven sections in parallel.

The operation of this step-up impedance transformer is the same as the operation of the step-down impedance transformer described in conjunction with the embodiment of Figure 3, except that now the input impedance $Z_{i2}=2Z_{i1}$ and $Z_{o2}=\frac{1}{2}Z_{o1}$, therefore the impedance transformation ratio $n_2$ is:

$$n_2=\frac{Z_{i2}}{Z_{o2}}=\frac{2Z_{i1}}{1/2Z_{o1}}=4\frac{Z_{i1}}{Z_{o1}}=4n_1 \tag{2}$$

Thus, the impedance transformation ratio of the step-up impedance transformer is four times as great as the transformation ratio of the single transformer of Figure 1.

For a wider range of either step-up or step-down transformation ratios, several disks similar to the one shown in Figure 1 may be connected either in series or in parallel combination by suitably prepolarizing them in accordance with the teachings of this invention. Moreover, the disks can be operated at either the fundamental frequency or any desirable harmonic thereof. Excellent results have been obtained by dimensioning the disks for first overtone operation.

While this invention has been described in conjunction with present preferred embodiments, it should be apparent that it is not limited thereto.

What is claimed is:

1. In combination, a piezoelectric ceramic I-F impedance transformer comprising at least two mechanically coupled relatively thin disks, a conductive electrode sandwiched between two flat faces of said disks, a center electrode and a concentric ring electrode symmetrically secured to each of the remaining two flat faces of said disks, each of said disks having axially polarized portions, the polarization between the center electrodes being in opposite directions in the respective disks and between the ring electrodes in the same direction in both disks, input and output terminals, means for connecting said input terminals to said center electrodes and to said conductive electrode, means for connecting said output terminals to said ring electrodes; and means for applying a high frequency signal to said input terminals.

2. The combination of claim 1 wherein the frequency of said signal corresponds to the fundamental resonant frequency of said disks.

3. The combination of claim 1, wherein the frequency of said signal corresponds to a harmonic of the fundamental resonant frequency of said disk.

4. In combination, a piezoelectric ceramic I-F impedance transformer comprising at least two mechanically coupled relatively thin axially polarized disks, a conductive electrode sandwiched between two flat faces of said disks, a center electrode and a concentric ring electrode symmetrically secured onto each of the remaining two flat faces of said disks; the axial polarization between the center electrodes being in the same direction in both disks and between the ring electrodes in opposite directions in the respective disks, input and output terminals, means for connecting said input terminals to said center electrodes, means for connecting said output terminals to said ring electrodes and to said conductive electrode; and means for applying a high frequency signal to said input terminals.

5. The combination of claim 4, wherein the frequency of said signal corresponds to the fundamental resonant frequency of said disks.

6. The combination of claim 4, wherein the frequency of said signal corresponds to a harmonic of the fundamental resonant frequency of said disks.

References Cited in the file of this patent

UNITED STATES PATENTS

| | | |
|---|---|---|
| 1,372,653 | Dessauer | Mar. 22, 1921 |
| 1,959,429 | Hovgaard | May 22, 1934 |
| 2,535,554 | Thurston | Jan. 24, 1949 |
| 2,863,076 | Koren et al. | Dec. 2, 1958 |
| 2,875,355 | Petermann | Feb. 24, 1959 |

OTHER REFERENCES

Elders: Proc. 1957, "Electronics Components Symposium," May 1957, pages 33–37.